United States Patent
Ko

(10) Patent No.: US 11,645,837 B1
(45) Date of Patent: May 9, 2023

(54) SYSTEM FOR CONSTRUCTING VIRTUAL CLOSET AND CREATING COORDINATED COMBINATION, AND METHOD THEREFOR

(71) Applicant: LOOKO INC., Daejeon (KR)

(72) Inventor: Hea Sin Ko, Daejeon (KR)

(73) Assignee: LOOKO INC., Daejeon (KR)

( * ) Notice: Subject to any disclaimer, the term of this patent is extended or adjusted under 35 U.S.C. 154(b) by 0 days.

(21) Appl. No.: 17/928,670

(22) PCT Filed: Sep. 11, 2020

(86) PCT No.: PCT/KR2020/012279
§ 371 (c)(1),
(2) Date: Nov. 30, 2022

(87) PCT Pub. No.: WO2022/025340
PCT Pub. Date: Feb. 3, 2022

(30) Foreign Application Priority Data

Jul. 30, 2020 (KR) .......................... 10-2020-0095358
Jul. 30, 2020 (KR) .......................... 10-2020-0095359

(51) Int. Cl.
*G06V 10/94* (2022.01)
*G06V 20/30* (2022.01)
(Continued)

(52) U.S. Cl.
CPC ......... *G06V 10/95* (2022.01); *G06Q 30/0631* (2013.01); *G06Q 30/0643* (2013.01);
(Continued)

(58) Field of Classification Search
CPC ........ G06V 10/95; G06V 10/74; G06V 20/30; G06V 40/166; G06V 40/171; G06Q 30/0631; G06Q 30/0643
See application file for complete search history.

(56) References Cited

U.S. PATENT DOCUMENTS 10,860,190 B1 * 12/2020 Ditzler .................. G06F 3/0485
2018/0182016 A1 * 6/2018 Giampaolo ........ G06Q 30/0641

FOREIGN PATENT DOCUMENTS

CN 109267289 A * 1/2019 ............. D06F 33/00
JP 2011081486 A * 4/2011
(Continued)

OTHER PUBLICATIONS

PCT International Search Report dated Apr. 27, 2021 for PCT/KR2020/012279.

(Continued)

*Primary Examiner* — Carol Wang
(74) *Attorney, Agent, or Firm* — Harness, Dickey & Pierce, P.L.C.

(57) ABSTRACT

A system for constructing a virtual closet according to an embodiment of the present disclosure includes: a user terminal detecting an image including a user's face, extracting a region corresponding to at least one fashion item in the detected image, restoring the fashion item from the region corresponding to the fashion item, collecting a fashion image matched to the restored fashion item, and extracting and transmitting a characteristic of the collected fashion image and a creation date of the detected image to a server; and the server analyzing a wearing date and wearing frequency of the fashion item on the basis of the extracted date, detecting all images of the user wearing the fashion item, and storing the extracted characteristic of the fashion image, the wearing date of the fashion item, and the images of the user wearing the fashion item together with the fashion image.

8 Claims, 18 Drawing Sheets

(51) Int. Cl.
　　　*G06V 40/16*　　　(2022.01)
　　　*G06Q 30/0601*　　(2023.01)
　　　*G06V 10/74*　　　(2022.01)

(52) U.S. Cl.
　　　CPC .............. *G06V 10/74* (2022.01); *G06V 20/30* (2022.01); *G06V 40/166* (2022.01); *G06V 40/171* (2022.01)

(56) References Cited

FOREIGN PATENT DOCUMENTS

| | | | | |
|---|---|---|---|---|
| JP | 2014102739 | A | * | 6/2014 |
| JP | 2017076315 | A | * | 4/2017 |
| JP | 2019067154 | A | * | 4/2019 |
| KR | 10-2012-0114806 | A | | 10/2012 |
| KR | 10-2019-0100094 | A | | 8/2019 |
| KR | 10-2019-0103098 | A | | 9/2019 |
| KR | 10-2020-0045668 | A | | 5/2020 |
| KR | 10-2020-0084647 | A | | 7/2020 |

OTHER PUBLICATIONS

Office Action from corresponding Korean Patent Application No. 10-2020-0095358, dated Jun. 29, 2021.

* cited by examiner

SYSTEM FOR CONSTRUCTING VIRTUAL CLOSET AND CREATING COORDINATED COMBINATION, AND METHOD THEREFOR

CROSS-REFERENCE TO RELATED APPLICATIONS

This application is a national phase application of PCT Application No. PCT/KR2020/012279, filed on Sep. 11, 2020, which claims benefit of Korean Patent Application Nos. 10-2020-0095358, filed on Jul. 30, 2020 and 10-2020-0095359, filed on Jul. 30, 2020. The entire disclosure of the applications identified in this paragraph are incorporated herein by references.

FIELD

The present disclosure relates to a system and method for constructing a virtual closet and creating a coordinated combination, and in more detail, a system and method for constructing a virtual closet and creating a coordinated combination, the system and method constructing a virtual closet on the basis of fashion items of a user and creating a coordinated combination by performing machine learning on the basis of input images.

BACKGROUND

The demands for personalized services are explosively increasing with the development of big data and artificial intelligence technologies. A personalized service, which provides a service that a user would prefer by analyzing the individual taste and desire of the user, can be applied to almost all fields including food, movie, traveling, and news. A fashion industry is also a field to which personalized services have been considerably applied, and the personalized services are used in the way of recommending products, which are expected to be preferred and very likely to be purchased by users, of recommending relevant shopping malls, or the like.

It is necessary to sufficiently find out the characteristic of each user in order to provide a good personalized service, but it is very difficult to find out individual fashion information in the fashion field. For example, it is substantially impossible for fashion service providers to obtain information about what kinds of clothes individuals have, what clothes individuals frequently wear or not, the body sizes and a fit preference of users, etc. Accordingly, most fashion personalized services at most recommend fashion products by estimating the tastes of users on the basis of indirect information of the users such as age, sex, search history, etc.

Information about clothes of users, what coordination the users make with the clothes, what clothes they wore, when they wore the clothes, and what styles they created is core data that are the base of an excellent fashion personalized service. Accordingly, there were many attempts to obtain such user closet data. For example, "smart closet", "your closet", etc. that are smartphone applications that were released in 2016 and are being serviced at present provide a function enabling individuals to make their own virtual closets.

However, users can construct their own virtual closets only when they take pictures of hundreds of clothes in person, remove the backgrounds in the pictures in person, and input various items of information about the clothes. Further, users have to record one by one when they wore the clothes, how they coordinate, etc. in the calendar of the application in person.

Accordingly, these services failed to collect many users due to the trouble that users have to take pictures of clothes one by one in person, remove the backgrounds in the pictures, and input various items of information in person. Further, many similar services that enable users to manage closets in the field of online exist, but most users are indifferent to those services because it is very difficult and troublesome to construct a virtual closet.

SUMMARY

The present disclosure has been made in an effort to solve the problems described above and an objective of the present disclosure is to provide a system and method for constructing a virtual closet and creating a coordinated combination, the system and method automatically extracting and storing fashion items of a user and creating and storing a coordinated set.

Another objective of the present disclosure is to provide a system and method for constructing a virtual closet and creating a coordinated combination, the system and method being able to create and recommend a coordinated combination in consideration of the fashion items of a user.

In order to achieve the objectives, a system for constructing a virtual closet according to an embodiment of the present disclosure includes: a user terminal detecting an image including a user's face, extracting a region corresponding to at least one fashion item in the detected image, restoring the fashion item from the region corresponding to the fashion item, collecting a fashion image matched to the restored fashion item, and extracting and transmitting a characteristic of the collected fashion image and a creation date of the detected image to a server; and the server analyzing a wearing date and wearing frequency of the fashion item on the basis of the extracted date, detecting all images of the user wearing the fashion item, and storing the extracted characteristic of the fashion image, the wearing date of the fashion item, and the images of the user wearing the fashion item together with the fashion image.

According to various embodiments of the present disclosure, since fashion items of a user are automatically stored, it is possible to provide a service that a user can more conveniently use and propose a coordinated set on the basis of the fashion items of the user.

DESCRIPTION OF EXEMPLARY EMBODIMENTS

The present disclosure is described hereafter in detail with reference to the accompanying drawings. Further, in describing the present disclosure, detailed descriptions of well-known functions or configurations relating to the present disclosure will not be provided so as not to obscure the description of the present disclosure with unnecessary details. Further, the following terminologies are defined in consideration of the functions in the present disclosure and may be construed in different ways by the intention or practice of users and operators. Therefore, the definitions thereof should be construed based on the contents throughout the specification.

Figure 1:
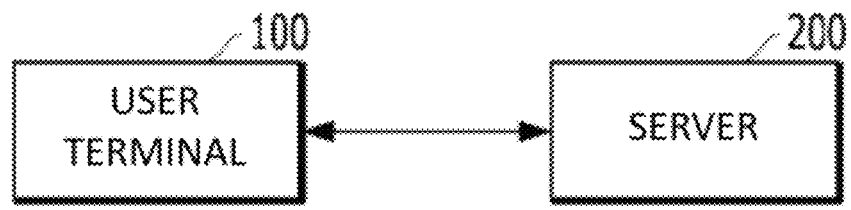
FIG. 1 is a configuration diagram of a system for constructing a virtual closet and creating a coordinated combination according to an embodiment of the present disclosure.

FIG. 1 is a configuration diagram of a system for constructing a virtual closet and creating a coordinated combination according to an embodiment of the present disclosure.

Referring to FIG. 1, a system 10 for constructing a virtual closet and creating a coordinated combination according to an embodiment of the present disclosure includes a user terminal 100 and a sever 200.

In the present disclosure, the system 10 for constructing a virtual closet and creating a coordinated combination means a system that constructs a virtual closet by automatically storing fashion items of a user, and creates, stores, and provides a coordinated set to a user on the basis of the fashion items of the user, and the fashion item may include not only clothing, fashion sundry products, and accessories, but also electronic devices or wearable devices that can be worn on a body as fashion items.

Further, the user terminal 100 may be implemented as a smartphone, a mobile device, etc., but is not limited thereto and may be implemented as various electronic devices such as a PDA, a pad type PC, a tablet PC, a wearable device, etc.

The user terminal 100 detects an image including a user's face, extracts a region corresponding to at least one fashion item in the detected image, restores the fashion item from the region corresponding to the fashion item, collects a fashion image matched to the restored fashion item, and extracts and transmits the characteristic of the collected fashion image and the creation date of the detected image to the server 200.

In particular, the user terminal 100 can receive images that are input through various routes, and in detail, the user terminal 100 may include a route of obtaining images by photographing through a lens, a route of downloading pictures through a social media, a route of downloading pictures stored in a storage medium such as a USB, etc.

The user terminal 100 can recognize faces in images input through various routes and classify the images in accordance with the faces. The user terminal 100 proposes frequently appearing faces to a user and when the user selects his/her face, the user terminal 100 detects an image including the selected user's face.

The user terminal 100 extracts a region corresponding to at least one fashion item that the user wears in the detected image.

The user terminal 100 automatically removes the background except for the fashion item from the extracted region corresponding to the extracted fashion item. The user terminal 100 determines whether an item having high similarity has been registered in a virtual closet on the basis of the fashion item with the background removed.

If an item that is highly similar to the fashion item with the background removed has been registered in a virtual closet, there is no need for a specific fashion item registration process. However, when an item that is highly similar to the fashion item with the background removed has not been registered in a virtual closet, the user terminal 100 performs a fashion item registration process.

In detail, the user terminal 100 restores a fashion item into a complete image. In general, this is because when a region corresponding to a fashion item that a user wears in a picture, a partial region of the fashion item is hidden by other fashion items or objects in many cases.

In this case, the user terminal 100 can create and obtain a complete image from a partial image of the fashion item through a trained Generative Adversarial Networks (GAN) model.

Alternatively, the user terminal 100 can search for and provide a fashion item having the highest similarity by comparing a partial image of the fashion item with fashion items stored in a database.

Meanwhile, the user terminal 100 collects a fashion image matched to the restored fashion item, and extracts and transmits the characteristic of the collected fashion image and the creation date of the detected image to the server 200.

In detail, the user terminal 100 can extract the characteristic of a fashion image matched to the restored fashion item, that is, the characteristic of a fashion image such as the kind, color, material, sense of season, ability to keep warm, etc. of the fashion item.

The user terminal 100 can extract the creation date of the detected image by extracting the information of the date on which the detected image including the user's face was taken.

The user terminal 100 can transmit the extracted characteristic of the fashion image and the creation date of the detected image to the server 200.

Meanwhile, the server 200 according to an embodiment of the present disclosure analyzes the wearing date and the wearing frequency of the fashion item on the basis of the extracted date, detects all images of the user wearing the fashion item, and stores the extracted characteristic of the fashion image, the wearing date of the fashion item, and images of the user wearing the fashion item together with the fashion image.

In detail, the server 200 stores the fashion image matched to the completed restored fashion item and the characteristic of the fashion image together in a virtual closet.

The server 200 can analyze the date on which images including the user's face were taken, automatically record that the user wearing fashion items in the images wore the fashion items on the date, and detect wearing frequency by analyzing how many times the user wore the fashion items for a specific period.

The server 200 detects all images taken with the user wearing each of the fashion items.

The server 200 stores the characteristics of the extracted fashion images, the wearing dates of the fashion items, and images of the user wearing the fashion items together with the fashion images in a virtual closet.

Accordingly, the server 200 can automatically store fashion images corresponding to the fashion items of the user in a virtual closet together with the characteristics of the fashion images, the wearing dates of the fashion items, and all images of the user wearing the fashion items.

Meanwhile, the server 200 according to an embodiment of the present disclosure can create a coordinated set image by grouping at least one fashion item included in a detected image, and can store the wearing date and frequency of the grouped fashion item, an image of the user wearing the grouped fashion item, and the created coordinated set together in a virtual closet.

In detail, the server 200 can analyze at least one fashion item that a user simultaneously wears in one detected image, automatically configure a coordinated set with the fashion item, and store an image of the coordinated set configured in this way in a virtual closet.

The server 200 can analyze the date on which an image including a user's face was taken, automatically record that the user wearing the coordinated set in the image wore the coordinated set on the date, and detect wearing frequency by analyzing how many times the user wore the coordinated set for a specific period.

The server 200 detects all images taken with the user wearing each coordinated set.

The server 200 stores the wearing date and wearing frequency of a coordinated set, an image of the user wearing the coordinated set, and a coordinated set image together in a virtual closet.

Accordingly, the server 200 can automatically store an image of a coordinated set configured on the basis of the fashion items of the user in the virtual closet together the wearing date and wearing frequency of the coordinated set, and all images of the user wearing the coordinated set.

The server 200 provides the information stored with the fashion item, that is, the characteristic of the fashion image, the wearing date of the fashion item, and all images of the user wearing the fashion item, and the information stored with the coordinated set, that is, the wearing date and wearing frequency of the coordinated set and all images of the user wearing the coordinated set to the user terminal 100.

Figure 2:
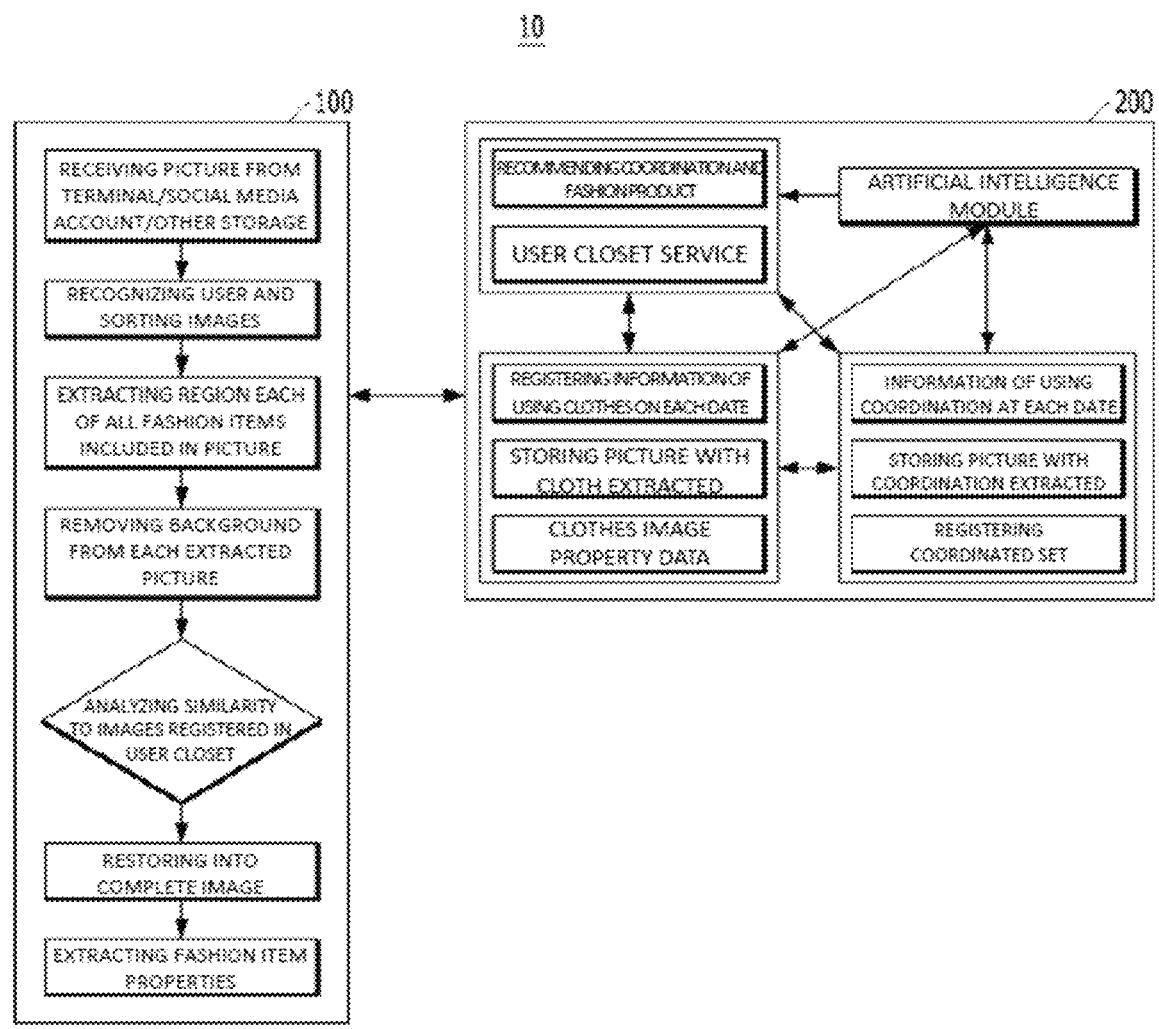
FIG. 2 is a diagram showing detailed data processing of the system for constructing a virtual closet and creating a coordinated combination according to an embodiment of the present disclosure.

FIG. 2 is a diagram showing detailed data processing of the system for constructing a virtual closet and creating a coordinated combination according to an embodiment of the present disclosure.

Referring to FIG. 2, the user terminal 100, as described above, can receive various pictures input from a terminal, a social media account, and other storages, recognize a user in the input various pictures, and sort images including the user.

The user terminal 100 can extract a region of each of all fashion items included in the pictures, and automatically remove a background in each of the extracted regions.

The user terminal 100 analyzes similarity between images registered in a virtual closet of the user and the extracted fashion items. When a fashion item is not searched for from the registered images due to low similarity, the user terminal 100 can restore the region of a fashion item into a complete image and extract the properties of the fashion item from the region of the restored fashion item.

The user terminal 100 can extract and transmit the extracted properties of the fashion item and the creation date of the image related to the fashion item to the server 200.

Meanwhile, the server 200 can store and register property data of a clothing image, the picture from which clothing was extracted, and information of using the clothing on the date on the basis of the received properties of the fashion items and the creation date of the image related to the fashion item.

The server 200 can store and register a coordinated set composed of at least one fashion item included in one detected image including the user's face, the picture from which the coordinated set was extracted, and the information of using the coordinated set at a date.

Meanwhile, the server 200 can create and provide a trendy fashion item or coordinated set to the user on the basis of fashion items and coordinated sets registered in an individual virtual closet of the user, product information acquired from an external shopping mall server, fashion information acquired from a social network, etc. through an artificial intelligence module.

The server 200 can recommend a product that is similar in style, feeling, color, etc. to a fashion item that a user has in a large quantity or frequently uses, or a product that can be coordinated with the fashion item on the basis of information registered in a virtual closet through the artificial intelligence module.

Figure 3:
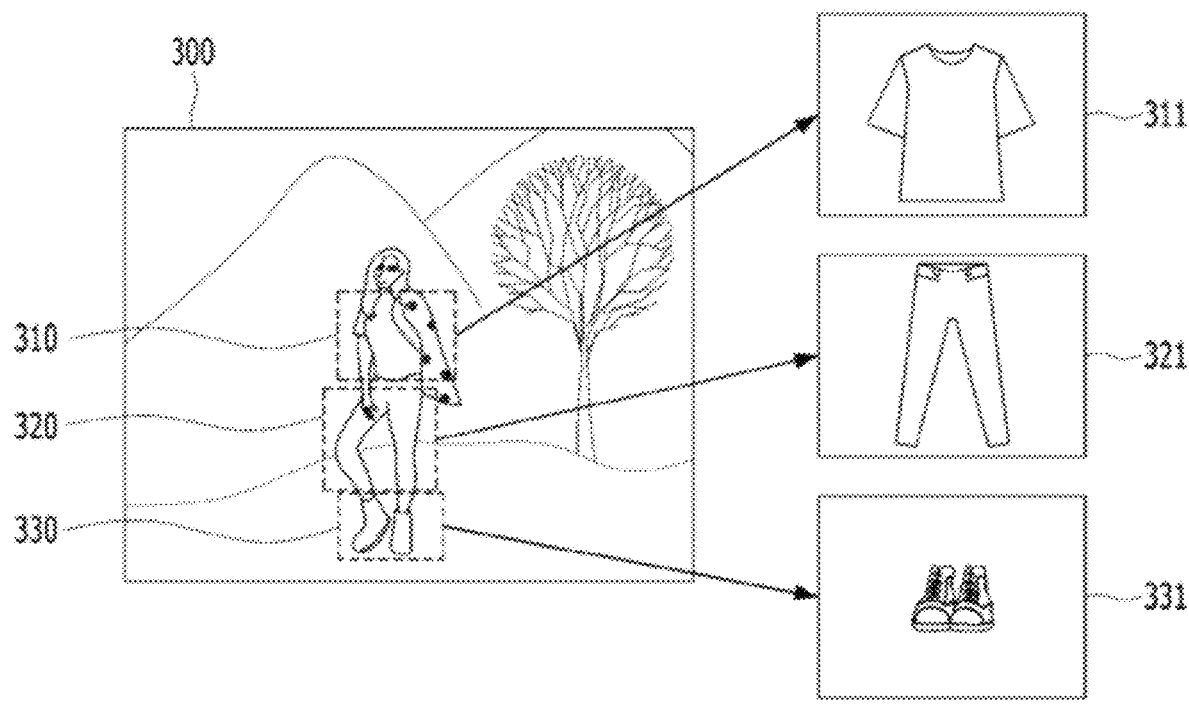
FIG. 3 is a diagram illustrating a process of extracting fashion items according to an embodiment of the present disclosure.

FIG. 3 is a diagram illustrating a process of extracting fashion items according to an embodiment of the present disclosure.

Referring to FIG. 3, the user terminal 100 extracts regions 310, 320, and 330 corresponding to fashion items from an input image 300 and automatically removes the backgrounds except for the fashion items from the extracted regions, thereby being able to extract clean images 311, 321, and 331 of only the fashion items.

The user terminal 100 analyzes the characteristic of each of the extracted images 311, 321, and 331. For example, the user terminal 100 analyzes an extracted image 311 that the kind is an upper garment, the material is cotton, and the style is a short sleeve shirt, and transmits the analyzed characteristics to the server 200 together with the extracted images 311, 321, and 331, and the server 200 stores the received extracted images 311, 321, and 331 and the received characteristic of the extracted image in a virtual closet.

Figure 4:
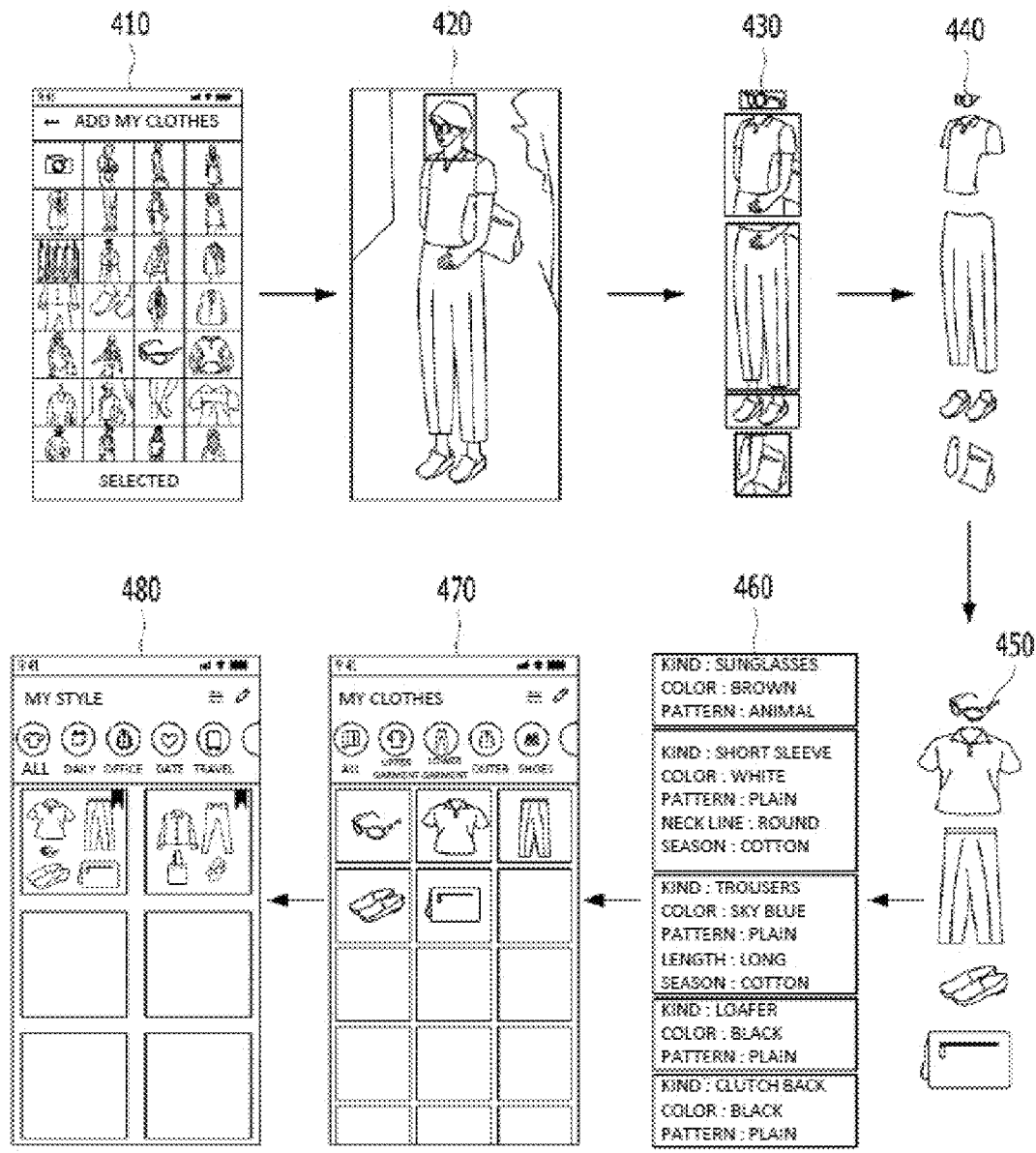
FIG. 4 is a diagram illustrating a process of constructing a virtual closet according to an embodiment of the present disclosure.

FIG. 4 is a diagram illustrating a process of constructing a virtual closet according to an embodiment of the present disclosure.

Referring to FIG. 4, a plurality of images input through various routes is stored in the user terminal 100 (410), and the user terminal 100 detects an image including the user's face (420), extracts regions corresponding to at least one fashion item (sunglasses, an upper garment, a lower garment, shoes, and a bag) in the detected image (430), and restores the fashion items into complete images by automatically removing the backgrounds in the extracted regions corresponding to the fashion items (sunglasses, an upper garment, a lower garment, shoes, and a bag) (S440).

The user terminal 100 collects fashion images matched to the restored fashion items (450) and detects characteristics of the collected fashion images (460). As the characteristics of collected fashion images, a kind, a color, a pattern, a sleeve, a neckline, a material, a sense of length, etc. are shown in FIG. 4.

When the user terminal 100 extracts and transmits the characteristics of the collected fashion images and the creation date of the detected image to the server 200, the server 200 automatically registers the extracted characteristics of the fashion images, the wearing date of the fashion items, etc. in a virtual closet together with the fashion images (470).

The server 200 creates and registers a coordinated set image configured by grouping at least one fashion item included in the detected user image (480).

When receiving regions corresponding to fashion items and the creation date of a detected image from the user terminal 100, the server 200 can analyze and update them in real time. That is, when receiving a region corresponding to a new fashion item and the creation date of a detected image from the user terminal 100, the server 200 analyzes and stores them in a virtual closet, thereby being able to update the virtual closet.

The user terminal 100 can extract purchase information and images of purchase products from a purchase history image and transmit them to the server 200.

Figure 5:
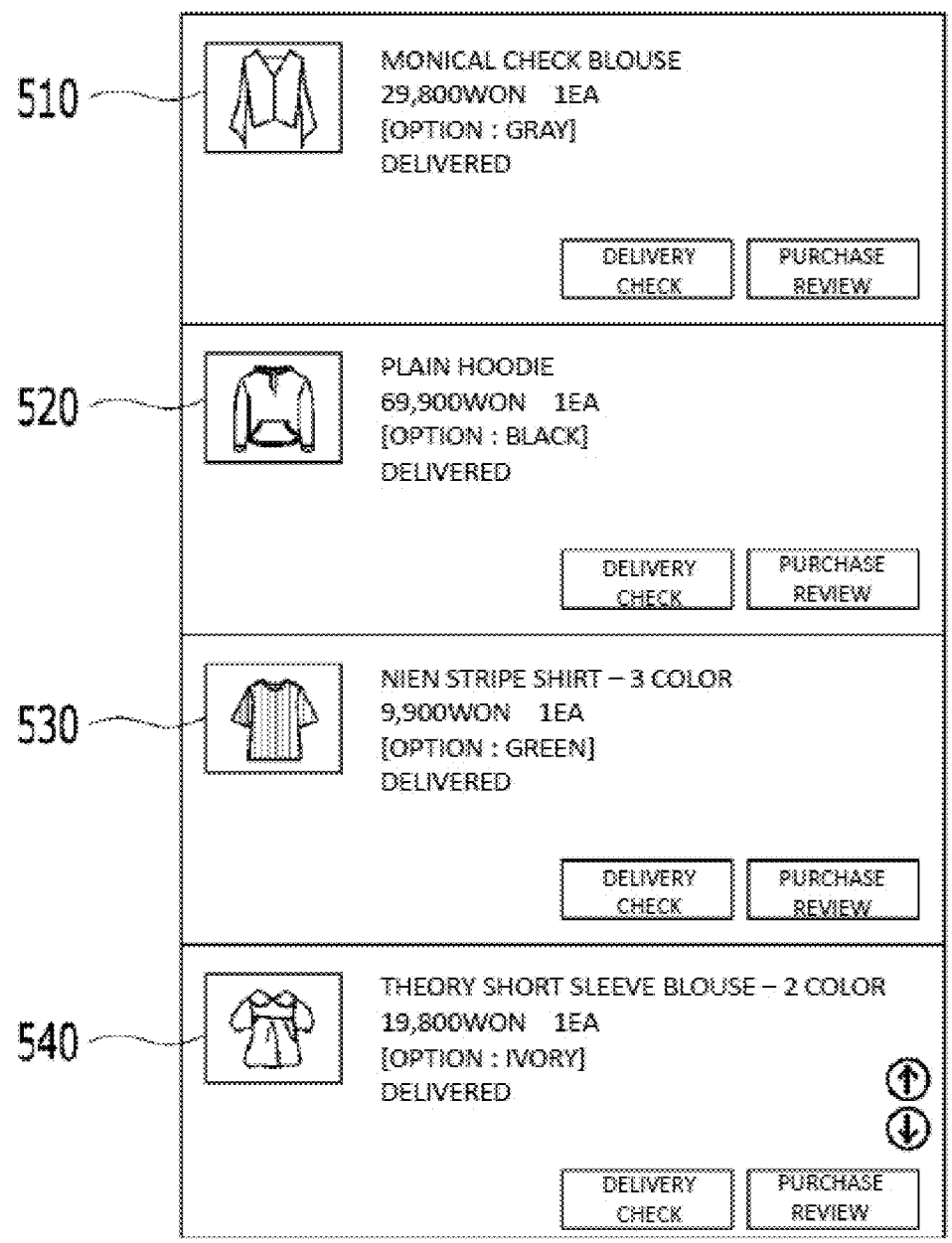
FIG. 5 is a diagram illustrating virtual closet construction according to another embodiment of the present disclosure.

FIG. 5 is a diagram illustrating virtual closet construction according to another embodiment of the present disclosure.

Referring to FIG. 5, the user terminal 100 extracts product images 520, 530, and 540 from a purchase history image 510 and transmits information such as the selected size, color information, cost, purchase date, quantity, etc. to the server 200.

The server 200 can extract the characteristics of the images of the purchase products and can store the extracted characteristics of the purchase products and the purchase information together with the images of the purchase products. In detail, the server 200 accesses a shopping mall that sells a purchase product and searches for the purchase product, and extracts various items of information such as a representative image and the specification of the searched purchase product.

The server 200 automatically removes the background of the extracted representative image, analyzes similarity to fashion items registered in a virtual closet, stops a registration process when a fashion item having high similarity has been registered in the virtual closet, and performs a registration process if the fashion item having high similarity is not registered.

Meanwhile, the server 200 may collect a fashion image corresponding to a fashion item, detect a characteristic, extract a date from a detected image including a user's face, and store them in a virtual closet, as described above, may extract a purchase product image from a purchase history image and store the purchase product image together with purchase information in a virtual closet, and may store them in a virtual closet by performing processes the same as those described above on a detected image including a user's face and a purchase history image for supplementation.

In detail, the server 200 analyzes similarity between a fashion item and a purchase product, replaces the fashion item with the purchase product, and stores information stored with the fashion item, purchase information, and the purchase product together when the similarity is a preset reference or higher.

This is because an image acquired in relation to a purchase product and the specification of the purchase product are generally likely to be more accurate.

The server 200 may extract a kind, a color, a material, etc. from a fashion image corresponding to a fashion item in a detected image including a user's face and store them in a virtual closet, and may extract information such as a size, a price, a purchase date, etc. from a purchase history image and store them in a virtual closet.

When a kind, a color, a material, etc. extracted from a purchase history image are clearer from those extracted from a fashion image corresponding to a fashion item, the server 200 may substitute and store the kind, color, material, etc. extracted from the purchase history image.

Meanwhile, the server 200 can collect fashion information on the basis of preference and the number of times of sharing on a social network, create a coordinated combination composed of at least one of fashion items and purchase products stored through the system for constructing a virtual closet on the basis of the collected fashion information, and provide the coordinated combination to the user terminal 100.

That is, the server 200 can collect fashion information on the basis of preference and the number of times of sharing of various fashion images acquired from a social network, a shopping mall server, etc. and can determine fashion information over a preset level in accordance with the collected fashion information through an artificial intelligence module.

The server 200 can provide a trendy coordinated combination, which is created by combining and configuring at least one of fashion items and purchase products stored through the system for constructing a virtual closet on the basis of the collected fashion information, to the user terminal 100.

Figure 6:
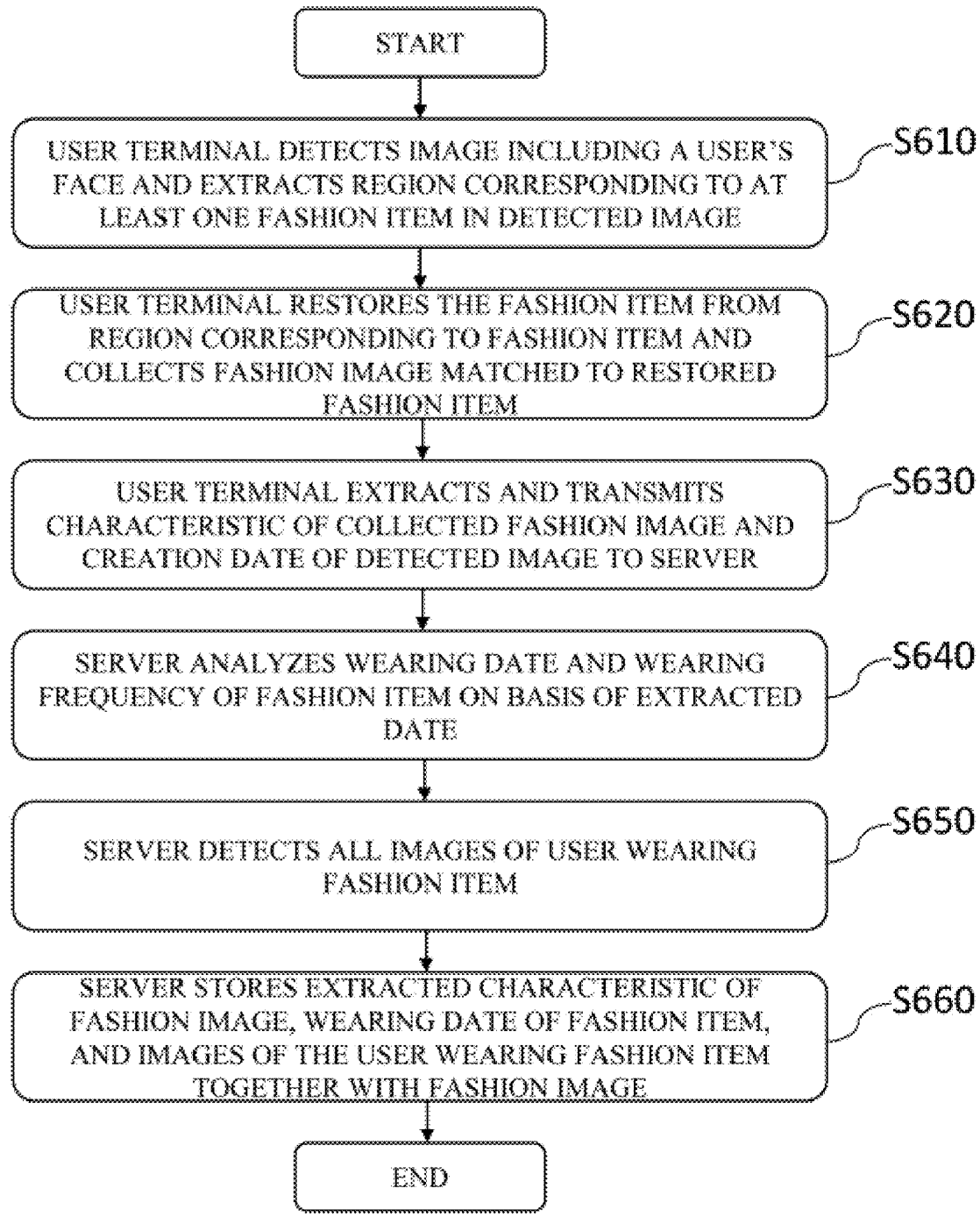
FIG. 6 is a flowchart illustrating a method of controlling a system for constructing a virtual closet and creating a coordinated combination according to an embodiment of the present disclosure.

FIG. 6 is a flowchart illustrating a method of controlling a system for constructing a virtual closet and creating a coordinated combination according to an embodiment of the present disclosure.

Referring to FIG. 6, a method of controlling a system for constructing a virtual closet and creating a coordinated combination according to an embodiment of the present disclosure includes: a step in which the user terminal 100 detects an image including a user's face and detects a region corresponding to at least one fashion item in the detected image (S610); a step in which the user terminal 100 restores the fashion item from the region corresponding to the fashion item and collects a fashion image matched to the restored fashion item (S620); a step in which the user terminal 100 extracts and transmits the characteristic of the collected fashion image and the creation date of the detected image to the server 200 (S630); a step in which the server 200 analyzes the wearing date and wearing frequency of the fashion item on the basis of the extracted date (S640); a step in which the server 200 detects all images of the user wearing the fashion item (S650); and a step in which the server 200 stores the extracted characteristic of the fashion image, the wearing date of the fashion item, and the images of the user wearing the fashion item together with the fashion image (S660).

The method of controlling a system for constructing a virtual closet and creating a coordinated combination according to an embodiment of the present disclosure may further include a step of creating a coordinated set image by grouping at least one fashion item included in the detected image, and storing the wearing date and frequency of the grouped fashion item, an images of the user wearing the grouped fashion item, and the created coordinated set in a virtual closet.

The method of controlling a system for constructing a virtual closet and creating a coordinated combination according to an embodiment of the present disclosure may further include a step of providing information stored with the fashion item and information stored with the coordinated set image to the user terminal.

The method of controlling a system for constructing a virtual closet and creating a coordinated combination according to an embodiment of the present disclosure may further include a step of analyzing and updating the region corresponding to the fashion item and the creation date of the detected image when the region and the creation date are received from the user terminal.

The method of controlling a system for constructing a virtual closet and creating a coordinated combination according to an embodiment of the present disclosure may further include a step of extracting purchase information and an image of a purchase product from a purchase history image and transmitting the purchase information and the image of the purchase product to the server.

The method of controlling a system for constructing a virtual closet and creating a coordinated combination according to an embodiment of the present disclosure may further include a step in which the server extracts the characteristic of the image of the purchase product and stores the extracted characteristic of the purchase product and the purchase information together.

The method of controlling a system for constructing a virtual closet and creating a coordinated combination according to an embodiment of the present disclosure may further include a step in which the server analyzes similarity between the fashion item and the purchase product, replaces the fashion item with the purchase product when the similarity is over a preset level, and stores the information stored with the fashion item, the purchase information, and the purchase product together.

The method of controlling a system for constructing a virtual closet and creating a coordinated combination according to an embodiment of the present disclosure may further include a step in which the server collects fashion information on the basis of preference and the number of times of sharing on a social network, and creates a coordinated combination composed of at least one of fashion items and purchase products stored through the system for constructing a virtual closet on the basis of the collected fashion information, and provides the coordinated combination to the user terminal.

Figure 7:
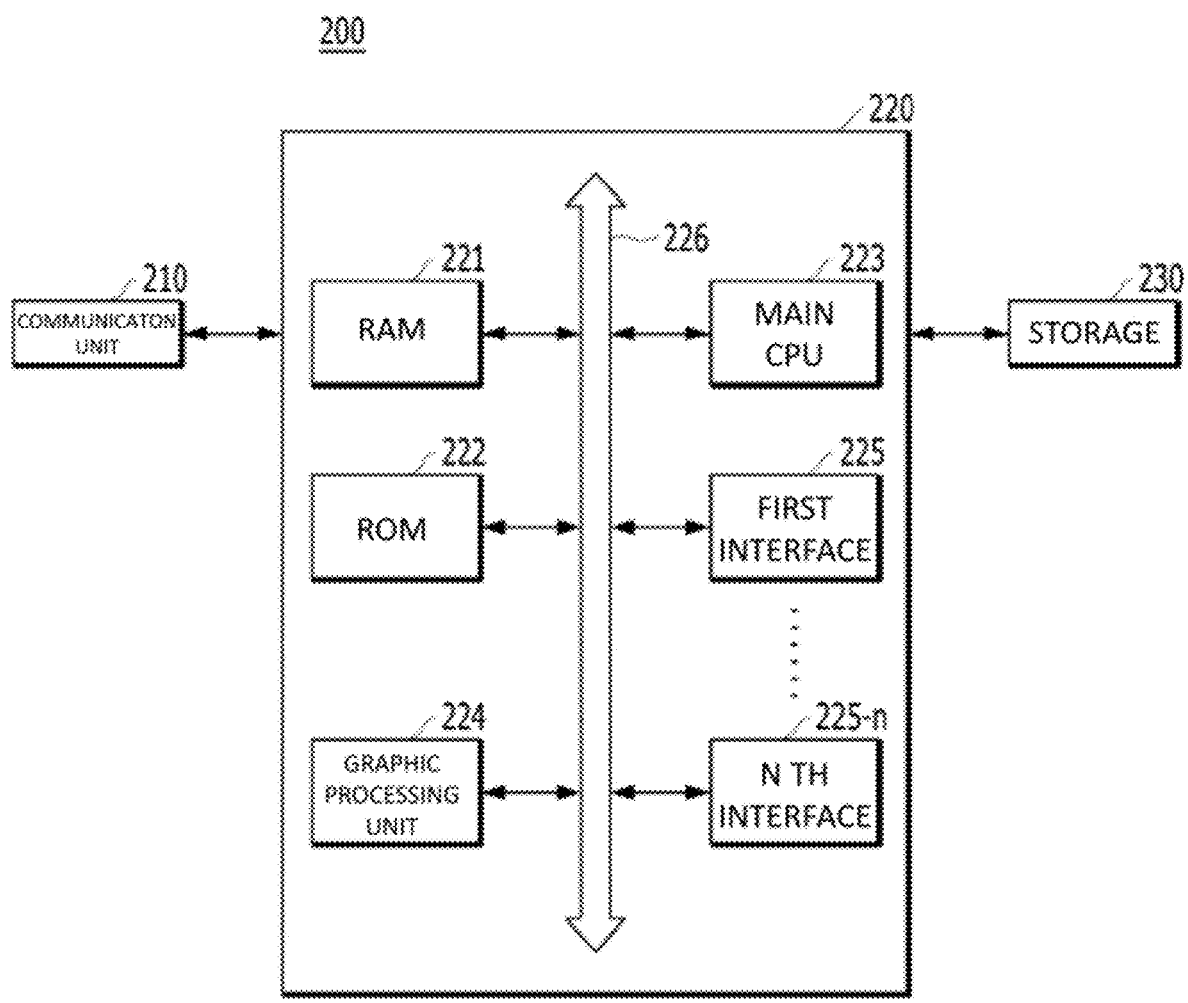
FIG. 7 is a diagram showing the detailed configuration of a server according to an embodiment of the present disclosure.

FIG. 7 is a diagram showing the entire configuration of a server according to an embodiment of the present disclosure.

Although FIG. 7 shows the entire configuration of the server 700, the user terminal 100 may also be shown in a similar configuration, and the configuration and functions described in relation to FIG. 7 may equally be applied to the user terminal 100.

The server 200 includes a communication unit 210, a processor 220, and a storage 230.

The processor 220 generally controls operation of the server 200 for analyzing the wearing date and the wearing frequency of a fashion item on the basis of an extracted date, detecting all images of a user wearing the fashion item, and storing an extracted characteristic of a fashion image, the wearing date of the fashion item, and images of the user wearing the fashion item together with the fashion image.

In detail, the processor 220 includes a RAM 221, a ROM 222, a main CPU 223, a graphic processing unit 224, first to n-th interfaces 225-1~225-n, and a bus 226.

The RAM 221, the ROM 222, the main CPU 223, the graphic processing unit 224, the first to n-th interfaces 225-1~225-n, etc. may be connected to each other through the bus 226.

The first to n-th interfaces 225-1~225-n are connected to the various components described above. One of the interfaces may be a network interface connected to an external device through a network.

The main CPU 223 accesses the storage 230 and performs booting using an O/S stored in the storage 230. Further, the main CPU 223 performs various operations using various programs, contents, data, etc. stored in the storage 230.

In particular, the main CPU 223 may analyze the wearing date and the wearing frequency of a fashion item on the basis of an extracted date, detect all images of a user wearing the fashion item, and store an extracted characteristic of a fashion image, the wearing date of the fashion item, and images of the user wearing the fashion item together with the fashion image in a virtual closet.

A set of commands for booting the system, etc. are stored in the ROM 222. When a turning-on instruction is input and power is supplied, the main CPU 223 copies the O/S stored in the storage to the RAM 221 and operates the O/S in accordance with the commands stored in the ROM 222, thereby booting the system. When booting is finished, the main CPU 223 copies various application programs stored in the storage 230 to the RAM 221 and executes the application programs copied to the RAM 221, thereby performing various operations.

The graphing processing unit 224 creates an image including various objects such as an icon, an image, a text, etc. using an operation unit (not shown) and a rendering unit (not shown). The rendering unit (not shown) computes property values such as coordinate values, shapes, sizes, colors, etc. for displaying the objects in accordance with the layout of the image on the basis of a received control instruction. An image of various layouts including the objects is created on the basis of the property values computed by rendering unit (not shown) and the operation unit (not shown).

In particular, the graphic processing unit 224 can implement an object created by the main CPU 223 into a Graphic User Interface (GPU), an icon, a user interface image, etc.

Meanwhile, the operations of the processor 220 described above may be performed by programs stored in the storage 230.

The storage 230 stores an Operating System (O/S) module and various data such as various multimedia contents for analyzing the wearing date and the wearing frequency of a fashion item on the basis of an extracted date, detecting all images of a user wearing the fashion item, and storing an extracted characteristic of a fashion image, the wearing date of the fashion item, and images of the user wearing the fashion item together with the fashion image.

In particular, the storage 230 may include a software module for analyzing the wearing date and the wearing frequency of a fashion item on the basis of an extracted date, detecting all images of a user wearing the fashion item, and storing an extracted characteristic of a fashion image, the wearing date of the fashion item, and images of the user wearing the fashion item together with the fashion image.

Figure 8:
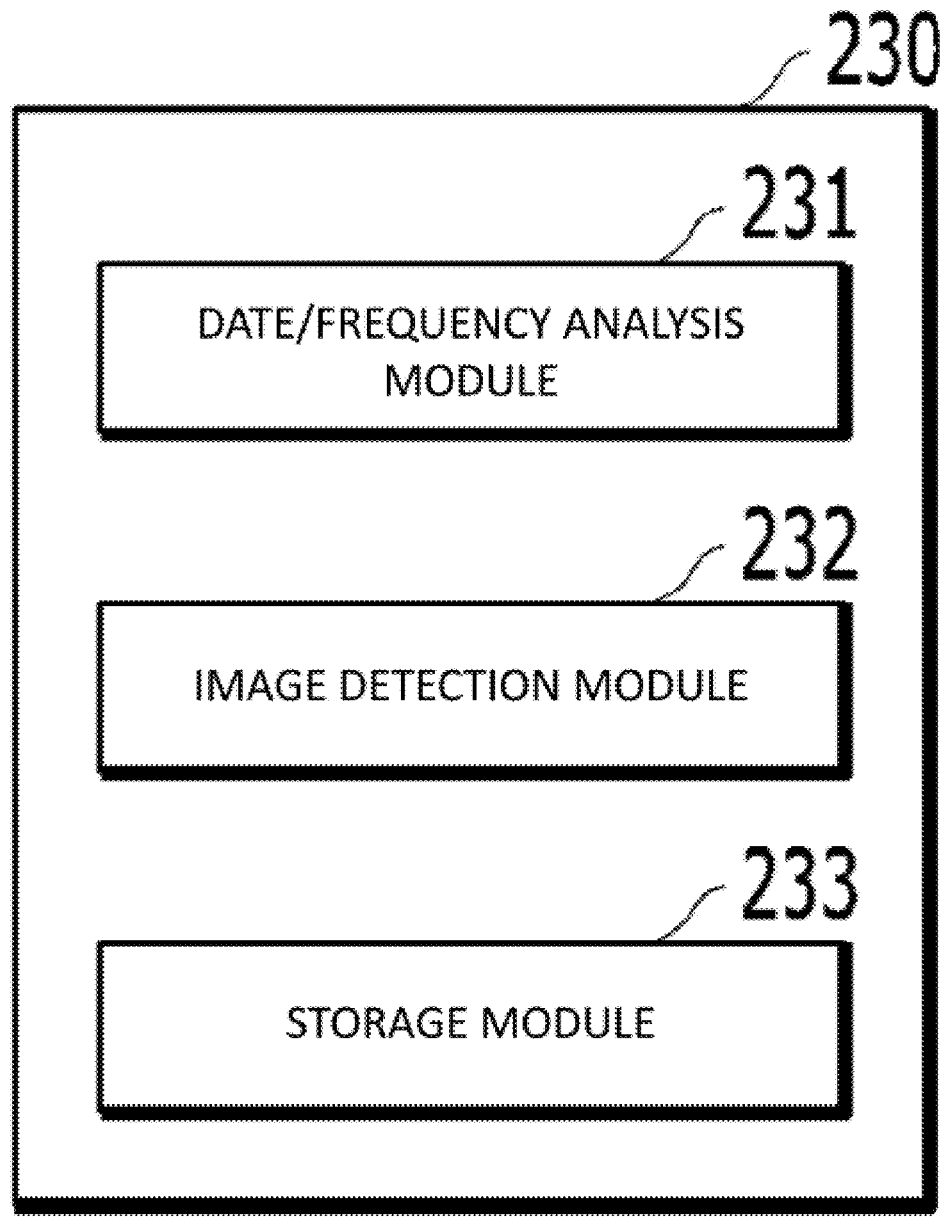
FIG. 8 is a diagram about software modules stored in a storage unit according to an embodiment of the present disclosure.

FIG. 8 is a diagram about software modules stored in a storage unit according to an embodiment of the present disclosure.

Referring to FIG. 8, programs such as a date/frequency analysis module 231, an image detection module 232, and a storage module 223 may be stored in the storage 230 of the server 200.

Meanwhile, the operations of the processor 220 described above may be performed by programs stored in the storage 230. Hereafter, detailed operations of the processor 220 using programs stored in the storage 230 are described in detail.

In detail, the date/frequency analysis module 231, on the basis of information of the date on which an image including a user's face was taken, can consider a fashion item or a coordinated set included in the image as being worn on the date and analyze the date on which the fashion item or the coordinated set was worn, or the wearing frequency for a specific period.

The image detection module 232 can detect all images of a user wearing a specific item.

The storage module 233 can store the characteristic of an extracted fashion image, the wearing date of a fashion item, and images of a user wearing the fashion item together with the fashion image.

Figure 9:
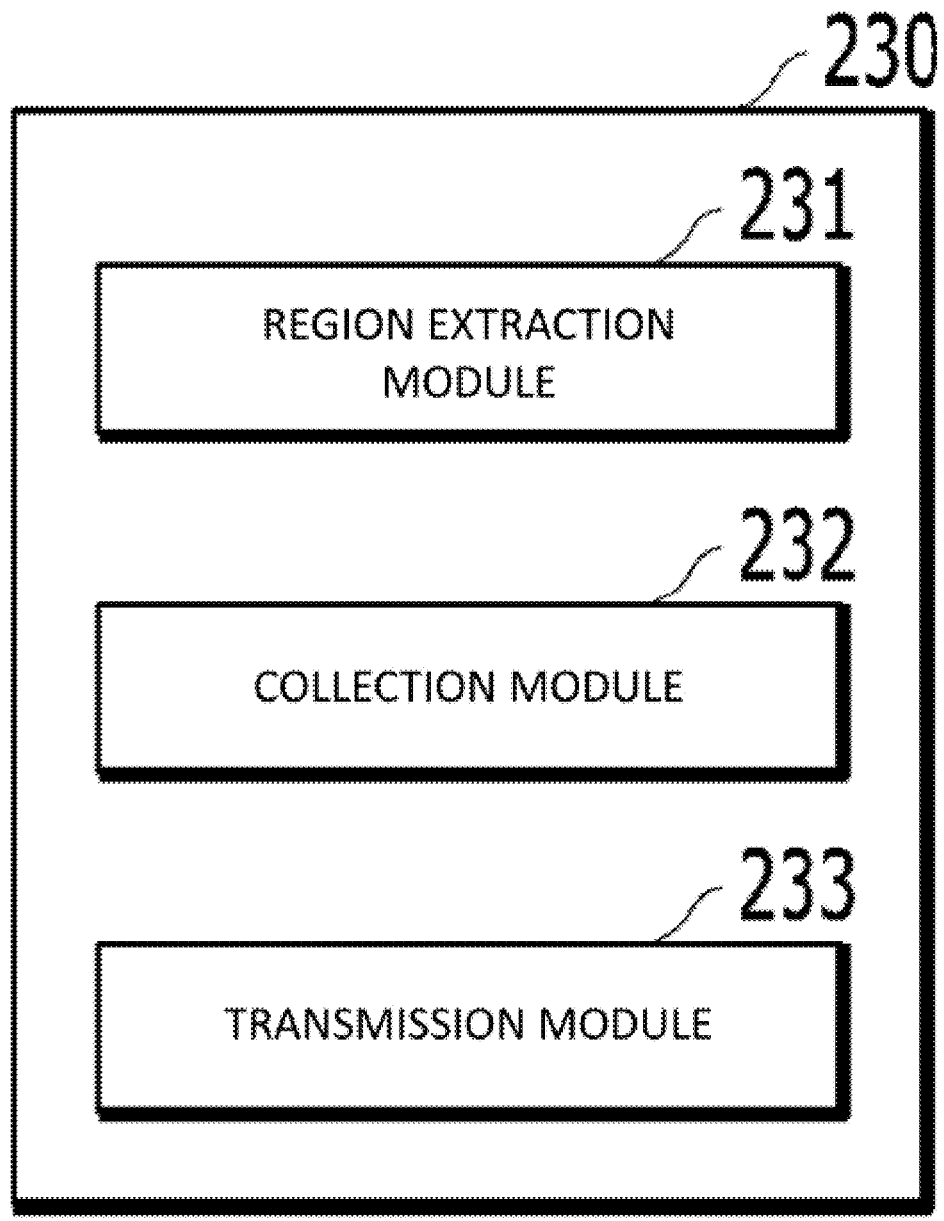
FIG. 9 is a diagram about software modules stored in a storage unit according to another embodiment of the present disclosure.

FIG. 9 is a diagram about software modules stored in a storage unit according to another embodiment of the present disclosure.

Referring to FIG. 9, the storage 230 included in the user terminal 100 is exemplified, and a region extraction module 231 can extract a region corresponding to at least one fashion item from a detected image including a user's face.

A collection module 232 can restore the fashion item from the region corresponding to the fashion item and collect a fashion image matched to the restored fashion item.

A transmission module 233 can extract and transmit the characteristic of the collected fashion image and the creation date of the detected image to the server.

Figure 10:
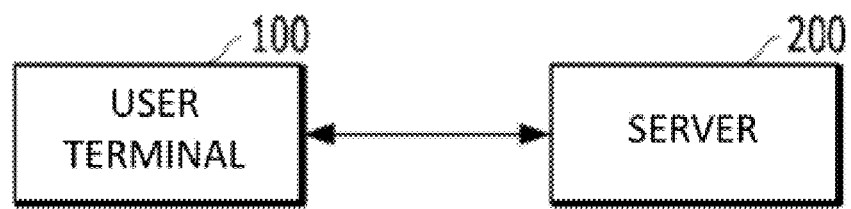
FIG. 10 is a configuration diagram of a system for constructing a virtual closet and creating a coordinated combination according to another embodiment of the present disclosure.

FIG. 10 is a configuration diagram of a system for constructing a virtual closet and creating a coordinated combination according to another embodiment of the present disclosure.

In this embodiment, a system 100 for constructing a virtual closet and creating a coordinated combination may mean a system for automatically creating and providing various coordinated combinations that can be recommended to a user, the target of coordination may include not only clothing, fashion sundry products, and accessories, but also electronic devices or wearable devices that can be worn on a body as fashion items.

A user terminal 100 can extract a region corresponding to a fashion item from an input image, and can create and transmit user information including at least one of the characteristic of the extracted region, a user shopping type, and user coordination conditions to a server 200.

In this case, there are various routes through which images are input for a coordination combination. In detail, the route may include a route or uploading a picture obtained by photographing through a lens, a route of uploading a picture on a social media, a route of uploading a picture stored in a storage medium such as a USB, etc.

As described above, when various images for a coordinated combination, the user terminal 100 can extract regions corresponding to a fashion item shown in the images.

For example, when a piece of trousers is shown in an image, it is possible to extract a region in which the piece of trousers is shown.

The user terminal 100 can extract the characteristic of an extracted region, in detail, can acquire only an image related to a fashion item by automatically removing the other background except for the fashion item and extract the characteristic of the extracted region by analyzing the acquired image of the fashion item.

In detail, the characteristic of an extracted region includes information about at least one of the kind, color, material, and style of a fashion item.

For example, the kind of a fashion item means whether the fashion item is an upper garment or a lower garment, the color mans a color, the material means whether it is cotton, and the style means whether it is a sportswear or a suit.

The user terminal 100 creates and transmits user information including at least one of the characteristic of the extracted region, and a user shopping type and user coordination conditions input from the user to the server 200.

The coordination conditions mean a guideline preset in relation to coordination by the user, may be set as a wearing purpose, a wearing situation, an atmosphere, weather, temperature, etc., and for example, when hot summer and exercise are set as coordination conditions, a coordinated combination is created for a sportswear that can be worn in hot summer.

Meanwhile, the user terminal 100 can receive a shopping type from a user, and the user shopping type includes a first shopping type according to a coordinated combination created by combination with at least one of product information and fashion information on the basis of an input image, and a second shopping type according to a coordinated combination created by combining images input on the basis of information selected by a user from product information and purchase information. This will be described below.

The server 200 extracts images corresponding to a fashion item from product information collected from a shopping mall server and fashion information collected on a social network, and analyzes the properties thereof.

In detail, the server 200 can collect property information such as a product image and the specification of the product uploaded on an aligned shopping mall from the shopping mall, and can collect an image of the product itself by removing the background in the product image uploaded on the shopping mall.

The server 200 can collect fashion information on the basis of preference and the number of times of sharing on a social network.

The server 200 extracts an image corresponding to the fashion item from the collected product information and fashion information and analyzes the properties thereof. For example, the server 200 analyzes the properties of a product on the basis of collected product information, that is, the specification of a product uploaded to a shopping mall, extracts an image, which corresponds to clothing or a fashion sundry product that an influencer or a celebrity wears on a social network, from the clothing or fashion sundry product, and analyzes the properties of thereof.

The server can determine a fashion combination over a preset level by performing machine learning on the extracted image and the analyzed properties. The server 200 can create a coordinated combination matched to a fashion combination determined on the basis of at least one of product information and fashion information, and user information.

In detail, in relation to an extracted image and analyzed properties, the server 200 can detect the kind of a fashion item included in an image, analyze and store properties such as the color, material, style, the degree of keeping warm, etc. of the detected fashion item, can acquire information about what the newest trend is in accordance with references such as what fashion items are the most preferred, what fashion items are the most shared on social networks, what fashion items are the most exposed to advertisements, etc. on the basis of stored data.

The server 200 can determine a fashion combination over a preset reference, that is, a fashion combination that coincides with the newest trend in accordance with the information about the acquired newest trend. Such fashion combination may be one fashion item or may include a combination of a plurality of fashion items.

The server 200 can create a coordinated combination configured such that at least one of user information received from the user terminal 100, product information acquired from a shopping mall server, and fashion information acquired from a social network is matched to the determined fashion combination.

In accordance with the types described above, the server 200 can create a trendy fashion style by appropriately combining images uploaded by a user, that is, images related to fashion items of a user and images related to fashion items that can be acquired from a social media or a shopping mall server.

In this case, the server 200 can determine a preset fashion combination on the basis of preference and the number of times of sharing, and can display coordinated combinations in the way of creating and arranging coordinated combinations in order of high degree of matching with the determined fashion combination.

Meanwhile, the server 200 can search for a photoshoot image corresponding to a created coordinated combination and can provide recommendation coordination information including the searched photoshoot image and the created coordinated combination to the user terminal 100.

That is, the server 200 searches for a photoshoot in which a created coordinated combination is worn, that is, sets similarity and searches for photoshoots included within the similarity range, and arranges and displays a photoshoot, which is determined as being the most matched to the created coordinated combination of the searched photoshoots, with the created coordinated combination, thereby being able to provide recommendation coordination information to the user terminal 100.

The server 200 can sequentially provide the recommendation coordination information from recommendation coordination information satisfying user coordination conditions. That is, the server can include coordination conditions input by a user, for example, a wearing purpose, a wearing situation, an atmosphere, weather, temperature, etc., and can arrange and display recommendation coordination information in accordance with conditions set to be prior by the user.

Figure 11:
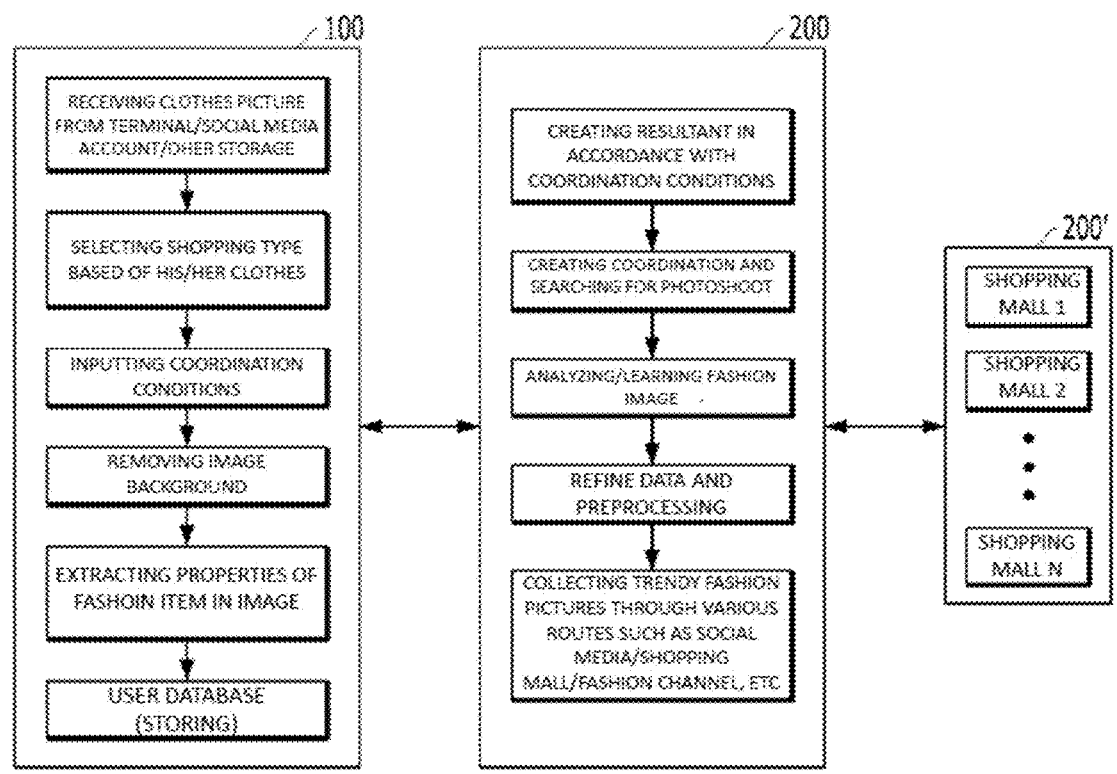
FIG. 11 is a diagram showing detailed data processing in the system and method for constructing a virtual closet and creating a coordinated combination according to an embodiment of the present disclosure.

FIG. 11 is a diagram showing detailed data processing in the system and method for constructing a virtual closet and creating a coordinated combination according to an embodiment of the present disclosure.

Referring to FIG. 11, the user terminal 100, as described above, can receive a fashion item, that is, a clothing picture in FIG. 11, from a terminal, a social media account, and other storages, automatically removes a background of each input image when a user selects a shopping type and inputs coordination conditions on the basis of his/her clothes, extracts the properties of a fashion item in the image and stores the properties in a user database, and simultaneously, creates and transmits user information including the properties of the fashion item, the selected shopping type, and the input coordination conditions to the server 200.

The server 200 collects a trendy fashion picture through various routes such as social media/shopping mall/fashion channel, and particularly, receives product information including an image and properties of a product uploaded on a shopping mall from an external server 200' such as the server of an aligned shopping mall.

The server 200 performs data refinement and preprocessing on the user information received from the user terminal 100 and the collected fashion picture and product information, and determines a fashion combination over a preset reference by performing fashion image analysis and learning, that is, machine learning on the data.

The server 200 creates coordination matched to the determined fashion combination on the basis of the user information, the collected fashion picture, and the product information, and searches for a photoshoot image corresponding to the created coordination.

The server 200 creates and provides a resultant including the coordination created in accordance with the input coordination conditions and the photoshoot image corresponding to the coordination to the user terminal 100.

Figure 12:
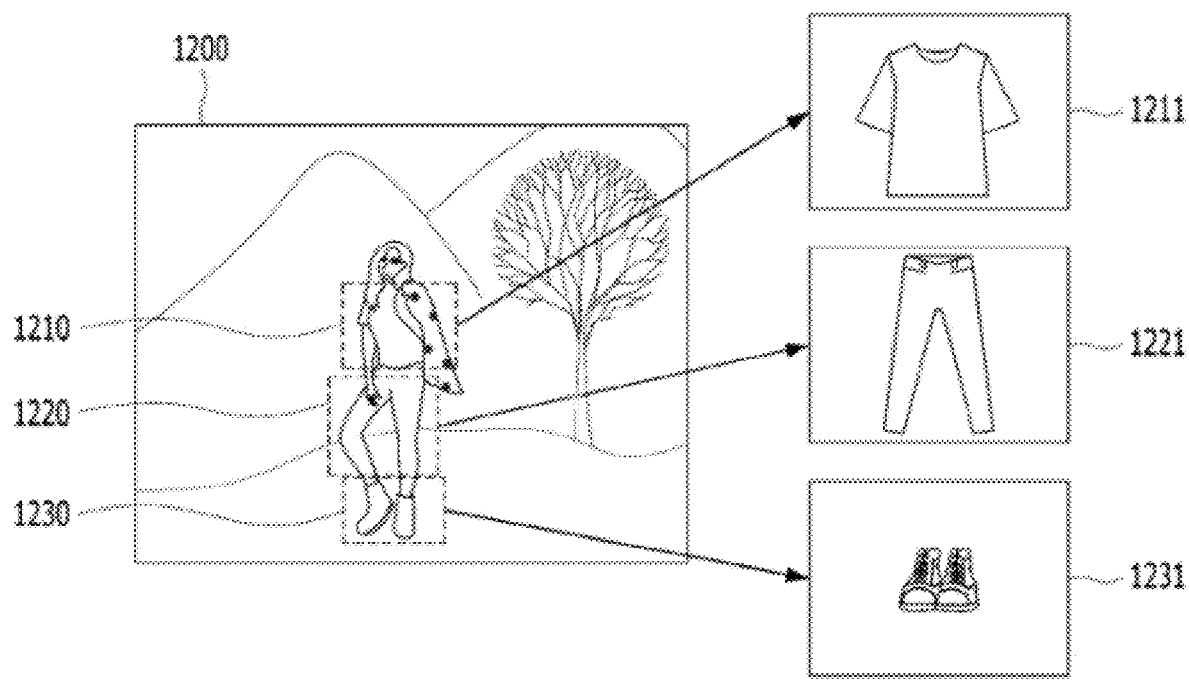
FIG. 12 is a diagram illustrating a process of creating user information according to an embodiment of the present disclosure.

FIG. 12 is a diagram illustrating a process of creating user information according to an embodiment of the present disclosure.

Referring to FIG. 12, the user terminal 100 extracts regions 1210, 1220, and 1230 corresponding to fashion items from an input image 1200 and automatically removes the backgrounds except for the fashion items from the extracted regions, thereby being able to extract clean images 1211, 1221, and 1231 of only the fashion items.

The user terminal 100 analyzes the properties of each of the extracted images 1211, 1221, and 1231. For example, the user terminal 100 analyzes an extracted image 1211 that the kind is an upper garment, the material is cotton, and the style is a short sleeve shirt, and stores the analyzed properties together with the extracted images 1211, 1221, and 1231 as user information.

Figure 13:
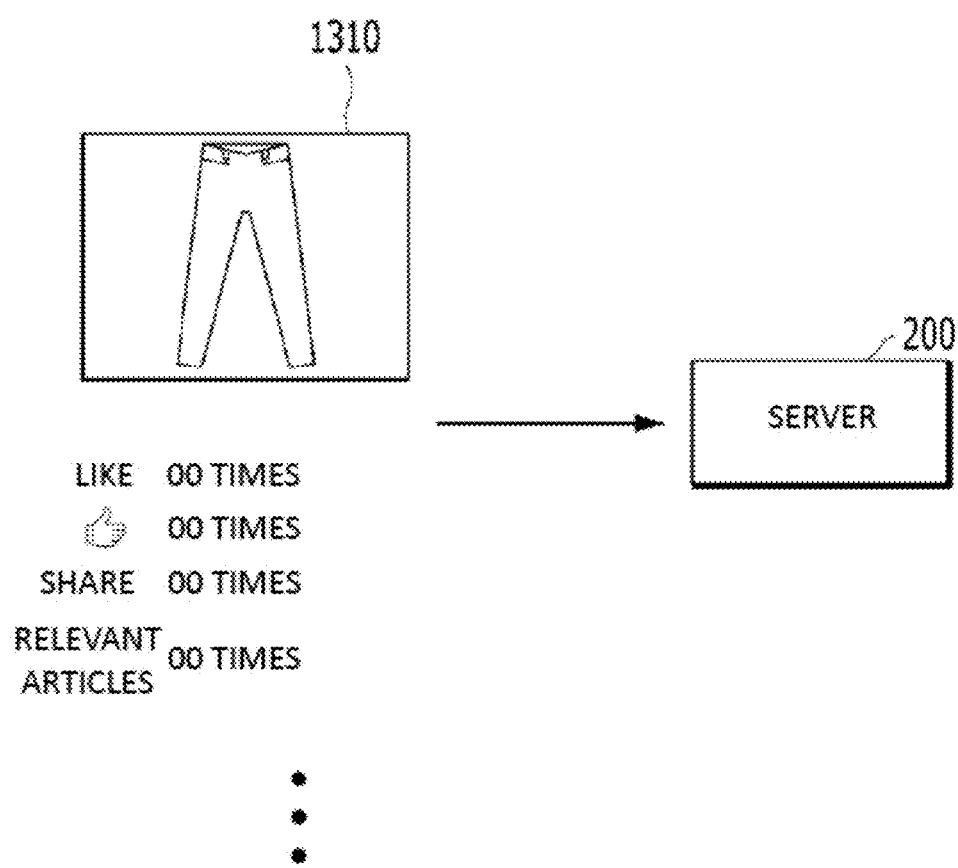
FIG. 13 is a diagram illustrating a process of acquiring fashion information according to an embodiment of the present disclosure.

FIG. 13 is a diagram illustrating a process of acquiring fashion information according to an embodiment of the present disclosure.

Referring to FIG. 13, the server 200 collects fashion information on the basis of preference and the number of times of sharing on a social network, and analyzes the kind, color, material, and style of a fashion item included in the collected fashion information.

For example, the server 200 can collect fashion information by determining preference related to a fashion item image 1310 by searching "number of likes", "number of emoticons for good", "number of shares", "related article", etc., and can analyze the kind, color, material, and style of a fashion item included in the fashion item image 1310 included in the collected fashion information.

In this process, the server 200 can determine information about what fashion item the most coincides with the newest trend, that is, a fashion combination, over a preset level by performing machine learning.

Meanwhile, as described above, a user can input a shopping type, the shopping type includes a first shopping type according to a coordinated combination created by combination with at least one of product information and fashion information on the basis of an input image input by a user, and a second shopping type according to a coordinated combination created by combining images input on the basis of information selected by a user from product information and purchase information. In relation to this, a coordinated combination creation process according to each shopping type is described with reference to FIG. 5 and FIG. 6.

Figure 14:
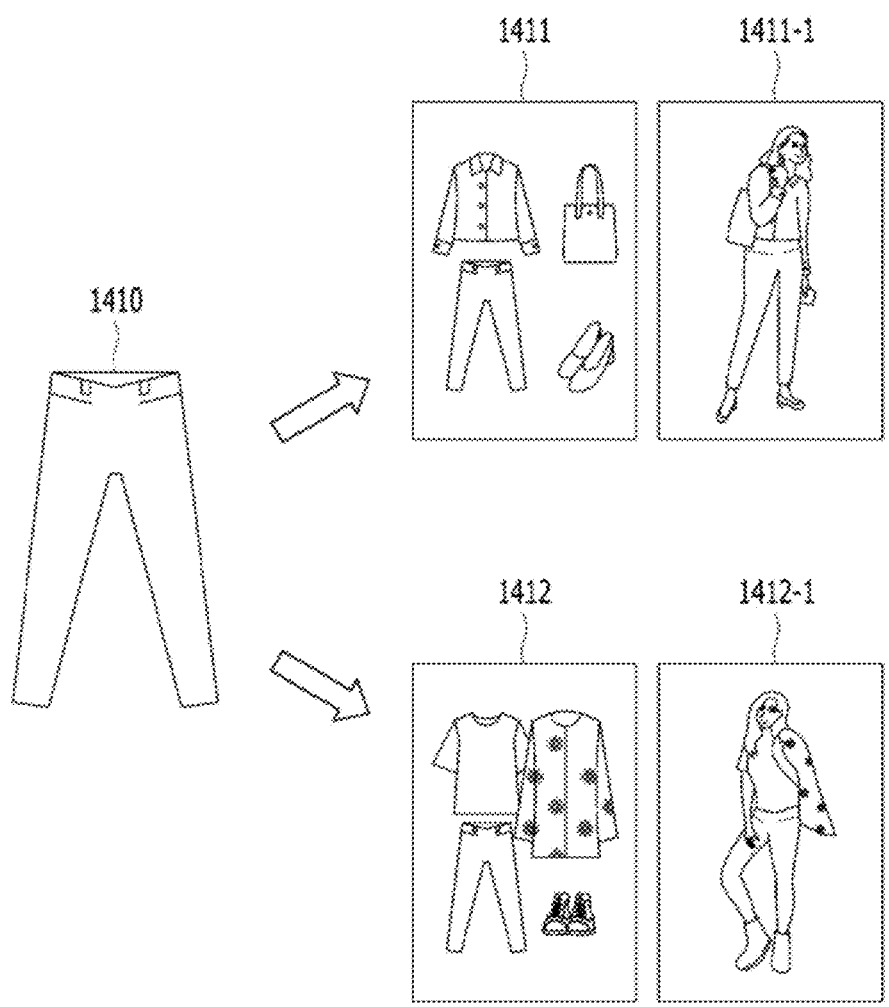
FIG. 14 is a diagram illustrating a process of creating a coordinated combination according to a first shopping type according to an embodiment of the present disclosure.

FIG. 14 is a diagram illustrating a process of creating a coordinated combination according to a first shopping type according to an embodiment of the present disclosure.

Referring to FIG. 14, a process of creating a coordinated combination according to a first shopping type input by a user is shown.

In detail, when a user updates a trousers image 1410, the server 200 can create a coordinated image 1411 coinciding with a newest trend by combining a fashion item image, which is acquired from product information acquired from an external server 200' and fashion information acquired from a social network, with the uploaded trousers image 1410, and can search for and provide a photoshoot image 1411-1 corresponding to the created coordinated combination 1411 together with the coordinated combination 1411.

Figure 15:
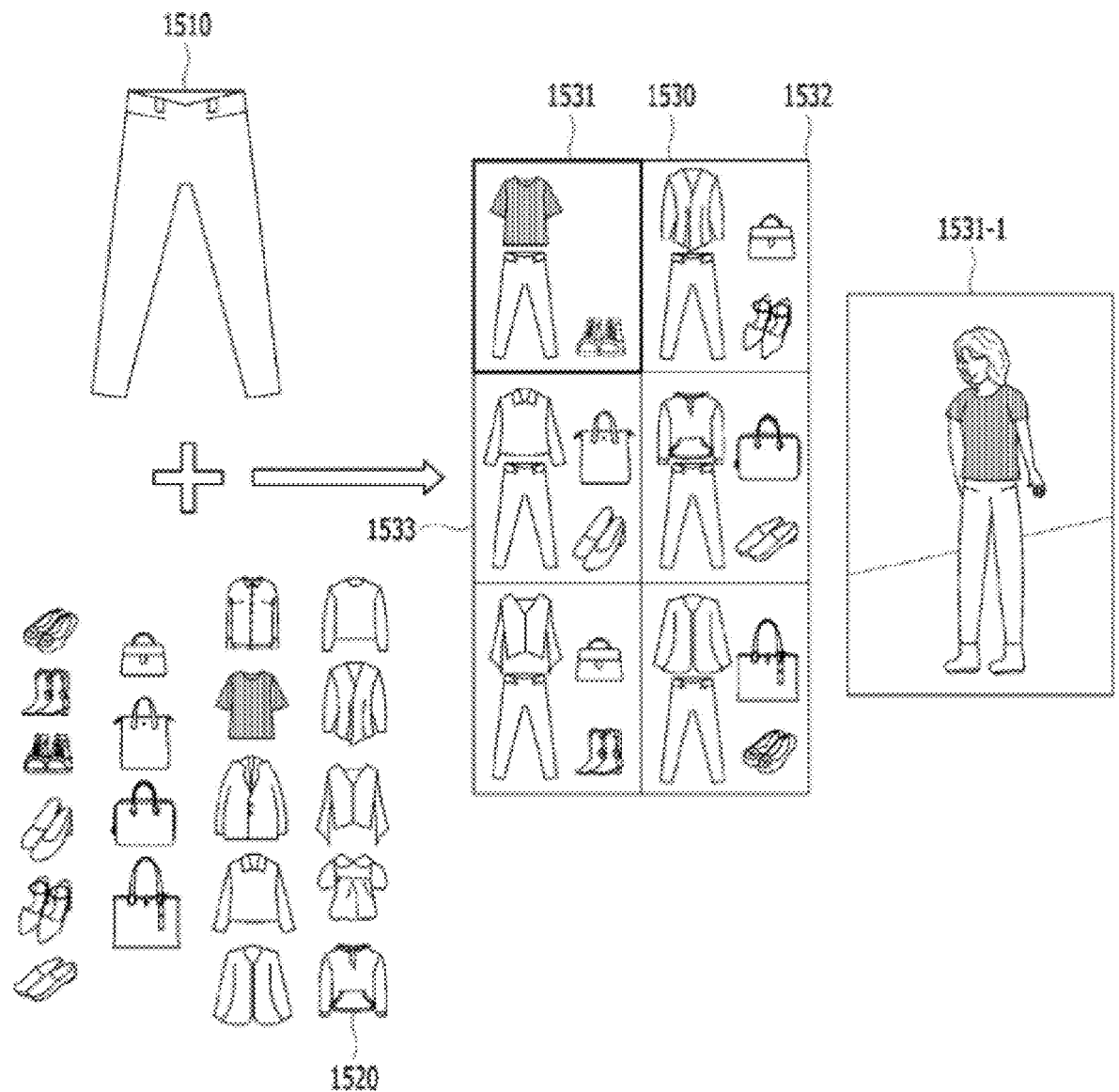
FIG. 15 is a diagram illustrating a process of creating a coordinated combination according to a second shopping type according to an embodiment of the present disclosure.

FIG. 15 is a diagram illustrating a process of creating a coordinated combination according to a second shopping method according to an embodiment of the present disclosure.

Referring to FIG. 15, a process of creating a coordinated combination according to a second shopping type input by a user is shown.

In detail, when a user selects a plurality of fashion items 1520 on a social network or a shopping mall, it is possible to create all available coordinated combinations 1530 by combining the selected plurality of fashion items 1520 and the trousers image 1410 uploaded by the user, and it is possible to arrange and display coordinated combinations 1531, 1532, and 1533 in high degrees of matching with fashion combinations over a preset reference determined on the basis of preference and the number of times of sharing.

When the user selects a coordinated combination 1531, the server 200 can search for and provide a photoshoot image 1531-1 corresponding to the selected coordinated combination 1531.

Figure 16:
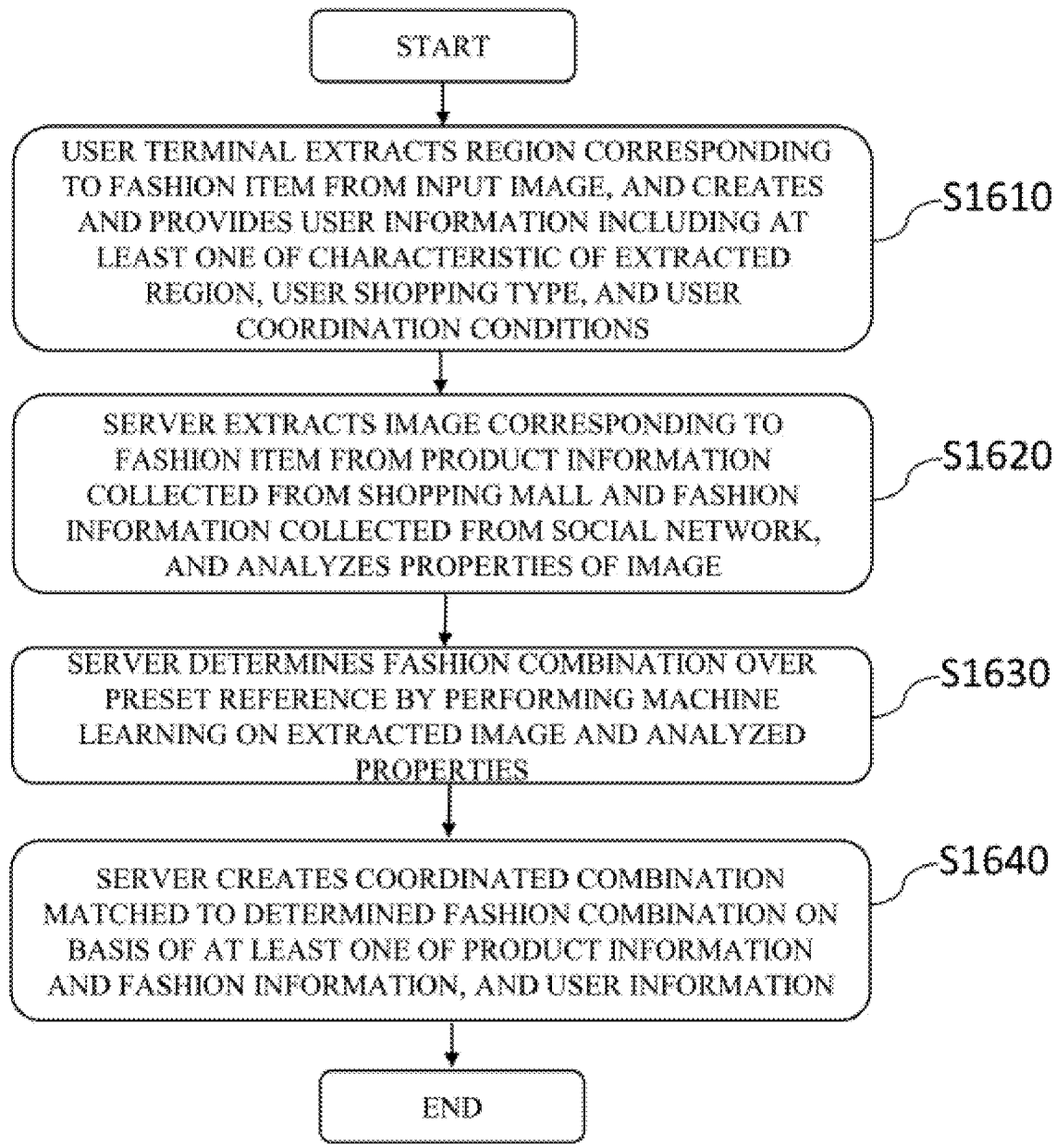
FIG. 16 is a diagram illustrating a method of creating a coordinated combination according to an embodiment of the present disclosure.

FIG. 16 is a diagram illustrating a method of creating a coordinated combination according to an embodiment of the present disclosure.

A method of creating a coordinated combination of the system for creating a coordinated combination including a user terminal and a server according to an embodiment of the present disclosure includes: a step in which the user terminal 100 extracts a region corresponding to a fashion item from an input image, and creates and provides user information including at least one of the characteristic of the extracted region, a user shopping type, and user coordination conditions (S1610); a step in which the server 200 extracts an image corresponding to the fashion item from product information collected from a shopping mall and fashion information collected from a social network, and analyzes the properties of the image (S1620); a step in which the server 200 determines a fashion combination over a preset reference by performing machine learning on the extracted image and the analyzed properties (S1630); and a step in which the server 200 creates a coordinated combination matched to the determined fashion combination on the basis of at least one of the product information and the fashion information, and the user information (S1640).

Meanwhile, the method of creating a coordinated combination according to an embodiment of the present disclosure may further include a step in which the server 200 searches for a photoshoot image corresponding to the created coordinated combination and provides recommendation coordination information including the searched photoshoot image and the created coordinated combination.

In this case, the characteristic of the extracted region includes information about at least one of the kind, color, material, and style of the fashion item.

The shopping type includes a first shopping type according to a coordinated combination created by combination with at least one of product information and fashion information on the basis of an input image, and a second shopping type according to a coordinated combination created by combining images input on the basis of information selected by a user from product information and purchase information.

The step of extracting an image corresponding to the fashion item and analyzing the properties thereof can collect fashion information on the basis of preference and the number of times of sharing on a social network, and analyze the kind, color, material, and style of a fashion item included in the collected fashion information.

The step of determining a fashion combination over a preset reference can determine a fashion combination over the preset reference on the basis of preference and the number of times of sharing, and the step of determining a coordinated combination can create coordinated combination in order or high degree of matching with the determined fashion combination.

The step of providing recommendation coordination information to the user terminal 100 can sequentially provide the recommendation coordination information from recommendation coordination information satisfying the user coordination conditions.

Figure 17:
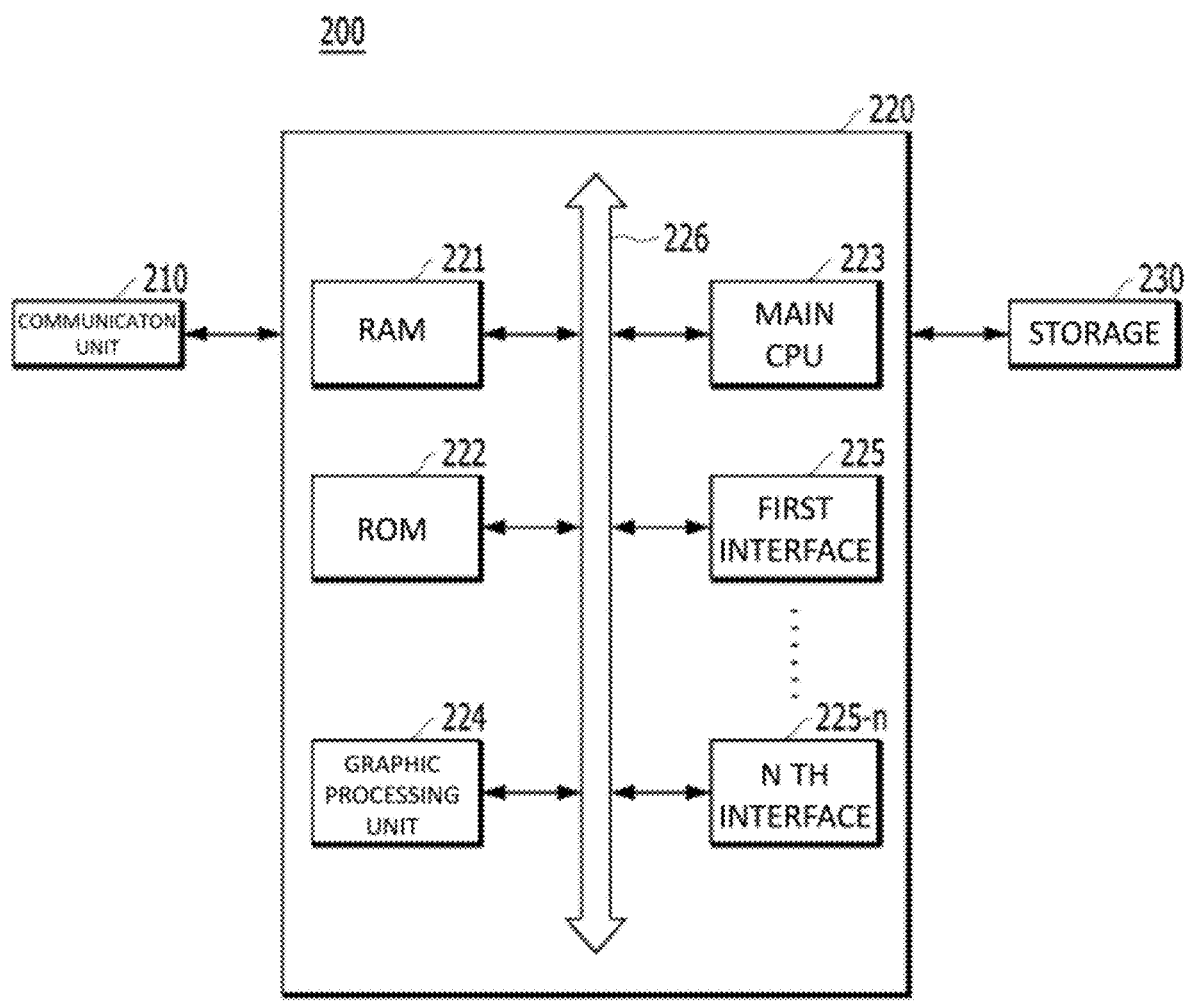
FIG. 17 is a diagram showing the detailed configuration of a server according to another embodiment of the present disclosure.

FIG. 17 is a diagram showing the detailed configuration of a server according to another embodiment of the present disclosure.

Although FIG. 17 shows the entire configuration of the server 700, the user terminal 100 may also be shown in a similar configuration, and the configuration and functions described in relation to FIG. 17 may equally be applied to the user terminal 100.

The server 200 includes a communication unit 210, a processor 220, and a storage 230.

The processor 220 generally controls operation of the server 200 for extracting an image corresponding to a fashion item from product information collected from a shopping mall server and fashion information collected from a social network, analyzing the properties thereof, determining a fashion combination over a preset reference by performing machine learning on the extracted image and the analyzed properties, and creating a coordinated combination matched to the determined fashion combination on the basis of at least one of the product information and the fashion information, and the user information.

In detail, the processor 220 includes a RAM 221, a ROM 222, a main CPU 223, a graphic processor 224, first to n-th interfaces 225-1~225-n, and a bus 226.

The RAM 221, the ROM 222, the main CPU 223, the graphic processing unit 224, the first to n-th interfaces 225-1~225-n, etc. may be connected to each other through the bus 226.

The first to n-th interfaces 225-1~225-n are connected to the various components described above. One of the interfaces may be a network interface connected to an external device through a network.

The main CPU 223 accesses the storage 230 and performs booting using an O/S stored in the storage 230. Further, the main CPU 223 performs various operations using various programs, contents, data, etc. stored in the storage 230.

In particular, the main CPU 223 can extract an image corresponding to a fashion item from product information collected from a shopping mall server and fashion information collected from a social network, analyze the properties thereof, determine a fashion combination over a preset reference by performing machine learning on the extracted image and the analyzed properties, and create a coordinated combination matched to the determined fashion combination on the basis of at least one of the product information and the fashion information, and the user information.

A set of commands for booting the system, etc. are stored in the ROM 222. When a turning-on instruction is input and power is supplied, the main CPU 223 copies the O/S stored in the storage to the RAM 221 and operates the O/S in accordance with the commands stored in the ROM 222, thereby booting the system. When booting is finished, the main CPU 223 copies various application programs stored in the storage 230 to the RAM 221 and executes the application programs copied to the RAM 221, thereby performing various operations.

The graphing processing unit 224 creates an image including various objects such as an icon, an image, a text, etc. using an operation unit (not shown) and a rendering unit (not shown). The rendering unit (not shown) computes property values such as coordinate values, shapes, sizes, colors, etc. for displaying the objects in accordance with the layout of the image on the basis of a received control instruction. An image of various layouts including the objects is created on the basis of the property values computed by rendering unit (not shown) and the operation unit (not shown).

In particular, the graphic processing unit 224 can implement an object created by the main CPU 223 into a Graphic User Interface (GPU), an icon, a user interface image, etc.

Meanwhile, the operation of the processor 220 described above may be performed by programs stored in the storage 230.

The storage 230 stores various data such as an Operating system (O/S) software module, and various multimedia contents for extracting an image corresponding to a fashion item from product information collected from a shopping mall server and fashion information collected from a social network, analyzing the properties thereof, determining a fashion combination over a preset reference by performing machine learning on the extracted image and the analyzed properties, and creating a coordinated combination matched to the determined fashion combination on the basis of at least one of the product information and the fashion information, and the user information.

In particular, the storage 230 may include a software module for extracting an image corresponding to a fashion item from product information collected from a shopping mall server and fashion information collected from a social network, analyzing the properties thereof, determining a fashion combination over a preset reference by performing machine learning on the extracted image and the analyzed properties, and creating a coordinated combination matched to the determined fashion combination on the basis of at least one of the product information and the fashion information, and the user information.

Figure 18:
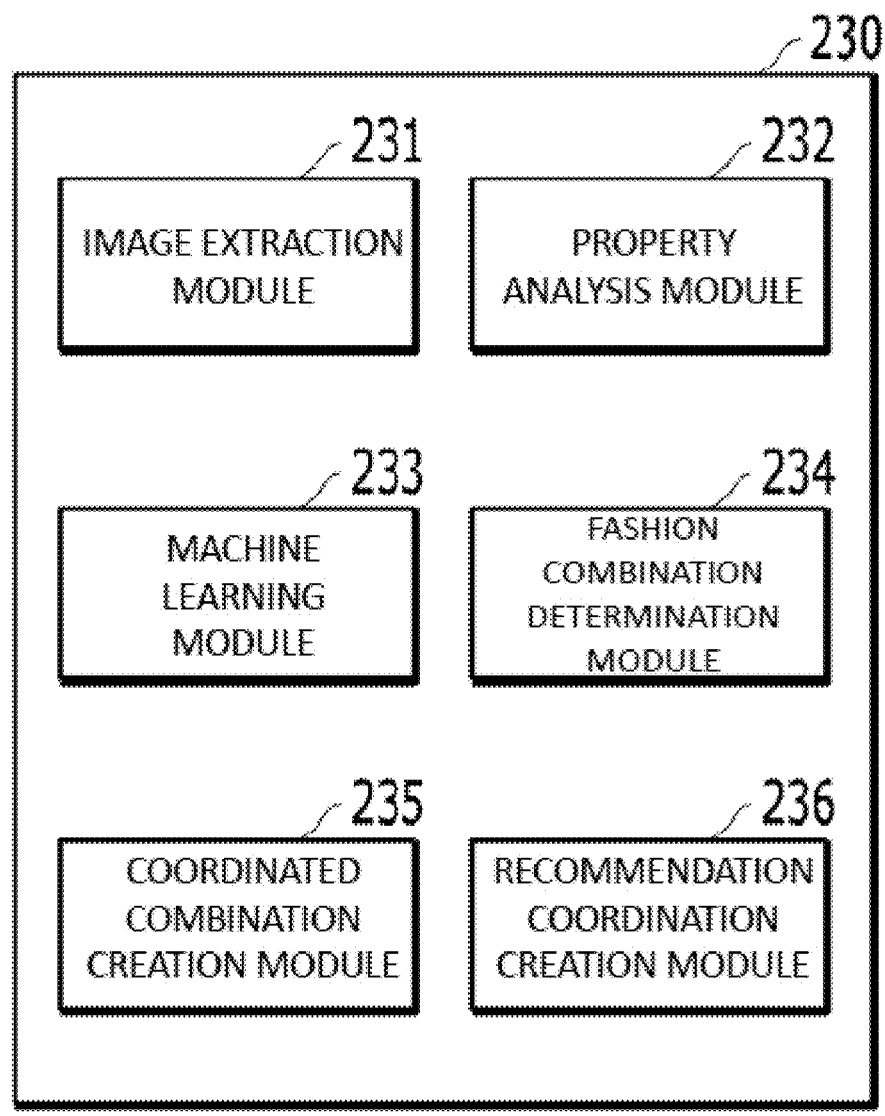
FIG. 18 is a diagram about software modules stored in a storage unit according to an embodiment of the present disclosure.

FIG. 18 is a diagram about software modules stored in a storage unit according to an embodiment of the present disclosure.

Referring to FIG. 18, programs such as an image extraction module 231, a property analysis module 232, a machine learning module 233, a fashion combination determination module 234, a coordinated combination creation module 235, a recommendation coordination creation module 236, etc. may be stored in the storage 230.

Meanwhile, the operation of the processor 220 described above may be performed by programs stored in the storage 230. Hereafter, detailed operations of the processor 220 using programs stored in the storage 230 are described in detail.

In detail the image extraction module 231 can extract a region corresponding to a fashion item from an image and automatically remove the background in the extracted region.

The property analysis module 232 can analyze the characteristic of the extracted region, that is, the kind, color, material, style, etc. of the fashion item.

The machine learning module 233 can analyze the kind, color, material, style, etc. of the fashion item included in fashion information collected from a social network and product information collected from an external server on the basis of the collected fashion and product information.

The fashion combination determination module 234 can determine a fashion combination over a preset reference on the basis of preference and the number of times of sharing.

The coordinated combination creation module 235 can create coordinated combination in order of high degree of matching with the determined fashion combination.

The recommendation coordination creation module 236 can create and sequentially provide the recommendable coordination information from recommendable coordination information satisfying user coordination conditions.

As described above, software for performing the operation of the user terminal 100 may also be stored in the store in a module type, and can enable a processor included in the user terminal 100 to read out a program or software from the storage and enable the user terminal 100 to extract a region corresponding to a fashion item from an input image and create and provide user information including at least one of the properties of the extracted region, a user shopping type, and user coordination conditions.

Meanwhile, a non-transitory computer readable medium in which a program that sequentially performs the control method according to the present disclosure is stored may be provided.

The non-transitory computer readable media is not media that stores data for a short time such as a cache, and a memory, but media that can semipermanently store data and can be read out by a device. In detail, the various applications or programs described above may be stored and provided in a non-transitory computer readable medium such as a CD, a DVD, a hard disk, a blueray disc, a USB, a memory card, and a ROM.

A bus is not shown in the block diagram described in relation to the processor for extracting an image corresponding to a fashion item from product information collected from a shopping mall server and fashion information collected from a social network, analyzing the properties thereof, determining a fashion combination over a preset reference by performing machine learning on the extracted image and the analyzed properties, and creating a coordinated combination matched to the determined fashion combination on the basis of at least one of the product information and the fashion information, and the user information, but communication between the components in the server may be performed through a bus. Each device may further include a processor such as a CPU, a microprocessor, etc. that performs the various steps described above.

Further, although exemplary embodiments of the present disclosure were illustrated and described above, the present disclosure is not limited to the specific exemplary embodiments and may be modified in various ways by those skilled in the art without departing from the scope of the present disclosure described in claims, and the modified examples should not be construed independently from the spirit of the scope of the present disclosure.

What is claimed is:

1. A system for constructing a virtual closet, comprising:
    a user terminal detecting an image including a user's face, extracting a region corresponding to at least one fashion item in the detected image, restoring the at least one fashion item from the region corresponding to the at least one fashion item, collecting a fashion image matched to the restored fashion item, and extracting and transmitting a characteristic of the collected fashion image and a creation date of the detected image to a server; and
    the server analyzing a wearing date and wearing frequency of the at least one fashion item on a basis of the extracted creation date, detecting all images of the user wearing the at least one fashion item, and storing the extracted characteristic of the fashion image, the wearing date of the at least one fashion item, and the images of the user wearing the at least one fashion item together with the fashion image,
    wherein the server creates a coordinated set image by grouping the at least one fashion item included in the detected image, and stores a wearing date and frequency of the grouped fashion item, an image of the user wearing the grouped fashion item, and the created coordinated set image together.

2. The system of claim 1, wherein the server provides information stored with the at least one fashion item and information stored with the coordinated set image to the user terminal.

3. The system of claim 2, wherein when the region corresponding to the at least one fashion item and the creation date of the detected image are received from the user terminal, the server analyzes and updates in real time the region and the creation date.

4. The system of claim 3, wherein the user terminal extracts purchase information and an image of a purchase product from a purchase history, and transmits the purchase information and the image of the purchase product.

5. The system of claim 4, wherein the server extracts a characteristic of the image of the purchase product and stores the extracted characteristic of the image of the purchase product and the purchase information of the purchase product together.

6. The system of claim 5, wherein the server analyzes similarity between the at least one fashion item and the purchase product, replaces the at least one fashion item with the purchase product and stores information stored with the at least one fashion item, the purchase information, and the purchase product together when the similarity is a preset reference or higher.

7. The system of claim 6, wherein the server collects fashion information on a basis of preference and a number of times of sharing on a social network, creates a coordinated combination composed of at least one of fashion items and purchase products stored through the system for constructing the virtual closet on a basis of the collected fashion information, and provides the coordinated combination to the user terminal.

8. A method of constructing a virtual closet, comprising:
    a step in which a user terminal detects an image including a user's face and extracts a region corresponding to at least one fashion item in the detected image;
    a step in which the user terminal restores the at least one fashion item from the region corresponding to the at least one fashion item and collects a fashion image matched to the restored fashion item;
    a step in which the user terminal extracts and transmits a characteristic of the collected fashion image and a creation date of the detected image to a server;
    a step in which the server analyzes a wearing date and wearing frequency of the at least one fashion item on a basis of the extracted creation date;
    a step in which the server detects all images of the user wearing the at least one fashion item;
    a step in which the server stores the extracted characteristic of the fashion image, the wearing date of the at least one fashion item, and the images of the user wearing the at least one fashion item together with the fashion image; and
    a step of creating a coordinated set image by grouping the at least one fashion item included in the detected image, and storing a wearing date and frequency of the grouped fashion item, an image of the user wearing the grouped fashion item, and the created coordinated image set together.

* * * * *